(12) United States Patent
Bann

(10) Patent No.: US 7,054,595 B2
(45) Date of Patent: May 30, 2006

(54) SYSTEMS AND METHODS FOR AMPLIFYING A TRANSMIT SIGNAL IN A RFID INTERROGATOR

(75) Inventor: Gary Bann, San Diego, CA (US)

(73) Assignee: Single Chip Systems Corporation, San Diego, CA (US)

( * ) Notice: Subject to any disclaimer, the term of this patent is extended or adjusted under 35 U.S.C. 154(b) by 18 days.

(21) Appl. No.: 10/658,633

(22) Filed: Sep. 8, 2003

(65) Prior Publication Data

US 2005/0054293 A1 Mar. 10, 2005

(51) Int. Cl.
*H04B 7/00* (2006.01)
(52) U.S. Cl. .................. 455/41.2; 455/78; 340/10.1
(58) Field of Classification Search ............. 455/41.2, 455/41.3, 41.1, 78, 73, 456.2; 340/10.1, 340/10.32, 10.42
See application file for complete search history.

(56) References Cited

U.S. PATENT DOCUMENTS 5,995,019 A * 11/1999 Chieu et al. ............. 340/10.32
6,356,764 B1 * 3/2002 Ovard et al. ............. 455/456.2
6,621,410 B1 * 9/2003 Lastinger et al. ........ 340/10.42

* cited by examiner

*Primary Examiner*—Doris H. To
*Assistant Examiner*—Lewis West
(74) *Attorney, Agent, or Firm*—Baker & McKenzie

(57) ABSTRACT

An RFID interrogator comprises an amplifier configured to amplify signals being transmitted by the RFID interrogator. The RFID interrogator also comprises a bypass path to direct received signals around the amplifier so that the amplifier does no block the reception of signals received from an RFID tag.

14 Claims, 5 Drawing Sheets

SYSTEMS AND METHODS FOR AMPLIFYING A TRANSMIT SIGNAL IN A RFID INTERROGATOR

BACKGROUND

1. Field of the Inventions

The field of the invention relates generally to Radio Frequency Identification (RFID) systems and more particularly to systems and methods for amplifying a transmit signal in an RFID interrogator.

2. Background Information

FIG. 1 is a diagram illustrating an exemplary RFID system 100. In system 100, RFID interrogator 102 communicates with one or more RFID tags 110. Data can be exchanged between interrogator 102 and RFID tag 110 via radio transmit signal 108 and radio receive signal 112. RFID interrogator 102 comprises RF transceiver 104, which contains transmitter and receiver electronics, and antenna 106, which are configured to generate and receive radio transit signal 108 and radio receive signal 112, respectively. Exchange of data can be accomplished via electromagnetic or electrostatic coupling in the RF spectrum in combination with various modulation and encoding schemes. RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 108 determines the operational range of RFID tag 110.

RF transceiver 104 transmits RF signals to RFID tag 110, and receives RF signals from RFID tag 110, via antenna 106. The data in transmit signal 108 and receive signal 112 can be contained in one or more bits for the purpose of providing identification and other information relevant to the particular RFID tag application. When RFID tag 110 passes within the range of the radio frequency magnetic field emitted by antenna 106, RFID tag 110 is excited and transmits data back to RF interrogator 102. A change in the impedance of RFID tag 110 can be used to signal the data to RF interrogator 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

Digital electronics 114, which can comprise a microprocessor with RAM, performs decoding and reading of receive signal 112. Similarly, digital electronics 114 performs the coding of transmit signal 108. Thus, RF interrogator 102 facilitates the reading or writing of data to RFID tags, e.g. RFID tag 110, that are within range of the RF field emitted by antenna 104. Together, RF transceiver 104 and digital electronics 114 comprise reader 118. Finally, digital electronics 114 and can be interfaced with an integral display and/or provide a parallel or serial communications interface to a host computer or industrial controller, e.g. host computer 116.

A common method of increasing the range and controlling the area within which RFID tags 110 can operate is to switch among multiple antennas (not shown). Since the RF field intensity of at least one of the antennas can be sufficient to power RF tag 110, the system range can be increase in this manner; however, there is a practical limit on the number of antennas 106 to which RF transceiver 104 can be switched. The additional cable lengths required for greater spatial diversity among antennas, along with the added switching complexity required by the additional antennas, results in power loss to the antennas. With decreased power, the operational range of RFID tags 110 is accordingly reduced.

SUMMARY OF THE INVENTION

An RFID interrogator comprises an amplifier configured to amplify signals being transmitted by the RFID interrogator. The RFID interrogator also comprises a bypass path to direct received signals around the amplifier so that the amplifier does no block the reception of signals received from an RFID tag.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Figure 1:
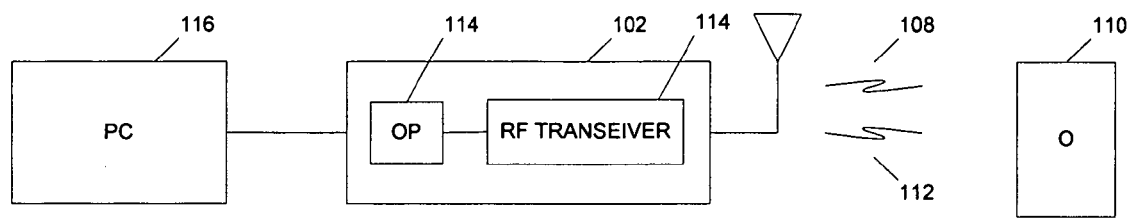
FIG. 1 is a diagram illustrating an exemplary RFID system.
Figure 2:
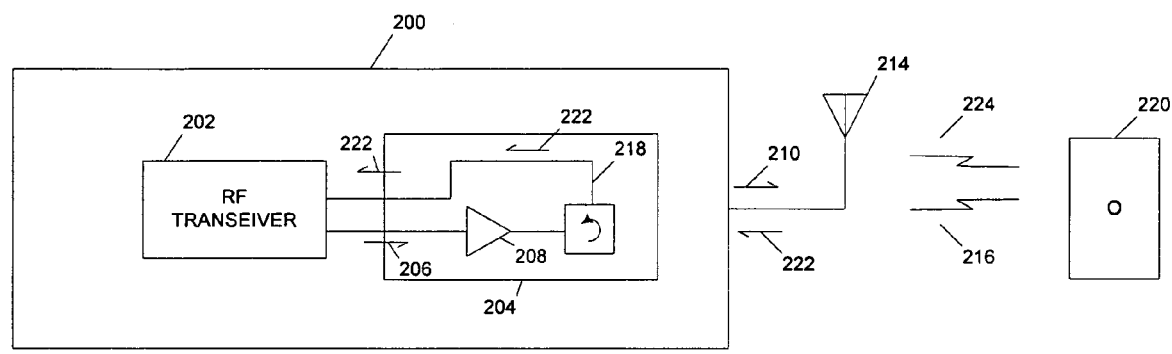
FIG. 2 is a diagram illustrating an example RFID system configured in accordance with one embodiment of the invention.

FIG. 2 illustrates an exemplary RFID interrogator 200 that is configured to use an amplifier 208 in accordance with one embodiment of the systems and methods described herein. In the example of FIG. 2, amplifier 208, energy director 212, and RF return path 218, comprise amplifier switch block 204. Thus, RF transceiver 202 can be configured to generate a transmit signal 206 that can be passed to amplifier 208 to produce amplified transmit signal 210. Amplified transmit signal 210 can then be directed to antenna 214, to be transmitted out to RFID tags 220. Thus, by setting the gain of amplifier 208 at an appropriate level, varying in transmit ranges can be achieved without comprising the data rate. Amplifier 208 can even be a variable gain amplifier as explained in more detail below. Briefly, however, the ability to vary the gain can allow the transmit range to be varied as required.

As in a conventional RFID system. RFID tag 220 can receive amplified transmit radio signal 229, encode the requisite data onto it, and reflect the signal as radio receive signal 216. Radio receive signal 216 can then be received by antenna 214, which generates receive signal 222. Unlike a conventional RFID system, however, receive signal 222 cannot return to RF transceiver 202 along the same path as transmit signal 210, because of the presence of amplifier 208. Essentially, amplifier 208 is a one way device and cannot allow receive signal 222 to pass in the other direction. Accordingly, RFID interrogator 200 also comprises an energy director 212 configured to allow transmit signal 210 to pass from amplifier 208 to antenna 214, but also configured to direct receive signal 222 around amplifier 208 to RF transceiver 202 along return path 218.

Thus, energy director 212 is configured to pass a transmit signal 210 of a certain frequency from a transmit input port to an antenna port, and to pass a receive signal 222 of the same frequency from the antenna port to a receive output port, while preventing transmit signal 210 from leaking onto return path 218 and receive signal 222 from leaking onto the transmit path. In one embodiment, for example, energy director 212 comprises a circulator. Circulators are well known and will not be described in detail here. In another embodiment, energy director 212 can comprise a directional coupler, which are also well known and not described in detail here.

Figure 3:
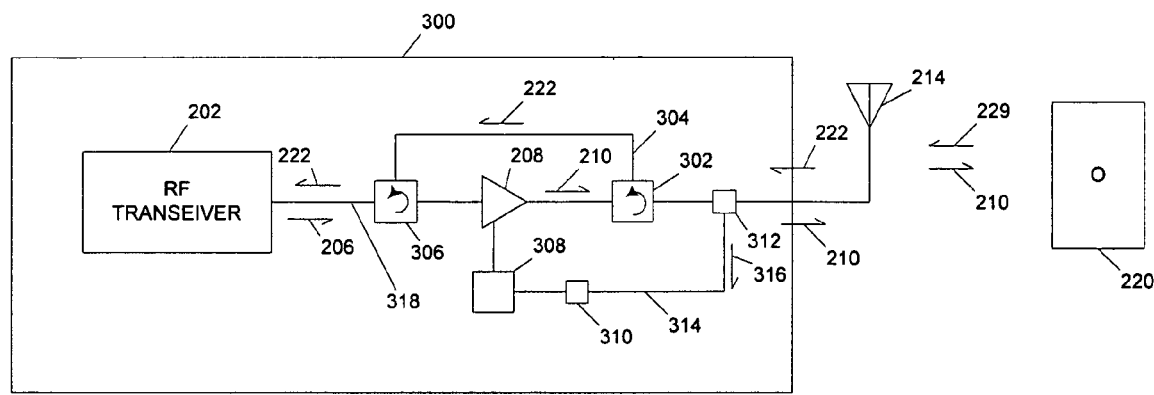
FIG. 3 is a diagram illustrating an example embodiment of an amplifier switch block included in the RFID system of FIG. 2.

FIG. 3 is a diagram illustrating an RF interrogator 300 that comprises an amplifier switch block 204 illustrated in more detail in accordance with one embodiment of the systems and methods described herein. In the embodiment of FIG. 3, amplifier switch block 204 comprises an energy director 302, which is configured to act in much the same manner as energy director 212 (FIG. 2), as well as an energy director 306. The inclusion of energy director 306 allows a common interface 318 with RF transceiver 202 for both transmit and receive signals 206 and 222, respectively. Thus, RF transceiver 202 does not need to be redesigned to accommodate a separate return path 218 (FIG. 2).

Accordingly, when a receive signal 222 is received, it is directed around amplifier 208 by energy director 302 to energy director 306 via return path 304. Energy director 306 can then be configured to direct receive signal 222 to RF transceiver 202 via interface 318. As with energy directors 302 and 212, energy director 306 can be, for example, a circulator or a directional coupler. Essentially, energy director 306 should be capable of directing a receive signal 222 from a receive port to a RF transceiver port, while preventing any undue leakage into amplifier 208. It should also be capable of directing a transmit signal 206 from the RF transceiver port to a transmit port, without undue leakage to the receive port.

As mentioned above, amplifier 208 can be a variable gain amplifier allowing the gain applied to transmit signal 210 to be varied to achieve various ranges or other performance objectives. For example, as is explained below, RFID interrogator 300 can be interfaced with a plurality of antennas 214 via a plurality of switches configured to interface transmit signal 210 with the appropriate antenna 214; however, each time a device, i.e., a switch, is placed in the transmit path there is an associated loss in transmit power. In other words, each device placed in the transmit path reduces the gain, or power, of transmit signal 210. Thus, the gain of amplifier 208 can be adjusted upwards in order to account for losses associated with devices placed in the transmit path, such as switches configured to couple transmit signal 210 with a plurality of antennas 214. In addition, transmit radio signal 216 can be affected by interference, which can reduce the range at which RFID interrogator 300 can operate. Often, such interference is variable and unpredictable. Thus, the gain of amplifier 208 can not only be adjusted to account for losses associated with components inserted into the transmit path, but also for losses associated with interference that exists at any given time.

Another concern, is that amplified signal 210 may exceed the legal maximum for power output established by appropriate regulatory bodies. Thus, the gain of amplifier 208 can be continually adjusted to ensure that any legal maximums are not exceeded. There are also other factors that can effect the actual transmit signal 216 power level such as losses in the interfaces between RF transceiver 202, amplifier switch block 204, and antenna 214. For example, the impedance of antenna 214 must be matched to the impedance of the interface between amplifier switch block 204 and antenna 214. Any mismatch in impedance, will result in signal power losses. Accordingly, the gain of amplifier 208 can be adjusted to account for any or all of the factors affecting the transmit signal power of transmit radio signal 216.

One way to continually adjust for the losses attributed to such factors as those described above is illustrated in FIG. 3. In the example of FIG. 3, a small amount of RF energy is directed along path 316 and is fed back to control the gain of amplifier 208. In one implementation, a small portion of the energy is coupled to path 316 by coupler 312 and rectified by rectifier 310 to create a control voltage that is used by a power leveling network 308 to control the gain of amplifier 208. Thus in one example embodiment, a small portion of the power in transmit signal 210 can be coupled along path 316 and used to create a control voltage that is in turn used by power leveling network 308 to control the gain of amplifier 208, ensuring that the power level of transmit signal 210 does not exceed any legal limitations. In another implementation, a small portion of the signal power in receive signal 222 can be coupled to path 316 and converted to a control voltage that can be used by power leveling network 308 in order to control the gain of amplifier 208 in a manner that would boost the range of RFID interrogator 300 as required. For example, lower receive signal power levels can indicate that RFID tag 220 is at the edge of the range of RFID interrogator 300. Thus, power leveling network 308 can, for example, be configured to compare the power of receive signal 222 with a predetermined threshold. When the signal power drops below the threshold, power leveling network 308 can be configured to determine that RFID tag 220 is at the edge of the operational range of RFID interrogator 300 and increase the gain of amplifier 208 in response. Conversely as the power level of receive signal 222 increases, power leveling network 308 can be configured to lower the gain of amplifier 208.

As can be seen, the gain of amplifier 208 can be maintained at an optimal level to ensure sufficient range for communicating with all RFID tags 220, while at the same time optimizing the power consumed by RFID interrogator 300. Further, the gain of amplifier 208 can at the same time be monitored to ensure that it doesn't exceed any legal limitations. Maintaining optimum power consumption via the control of the gain of amplifier 208 can, for example, be significant for portable applications that use batteries to supply power to RFID interrogator 300.

As mentioned above, RFID interrogator 300 can be interfaced with a plurality of antennas 214. For example, RFID interrogator 300 can be interfaced with a plurality of antennas via various switching mechanisms placed in the transmit path. Again, as mentioned above, each switching mechanism placed in the transmit path will lower the transmit power of transmit signal 210. By sensing the transmit power output by each antenna 214, however, the loss of power can be counteracted through controlled increases of the gain of amplifier 208.

The distance between an antenna 214 and RFID interrogator 300 can also result in corresponding losses in the transmit power of transmit signal 210. For example, an antenna 214 is often interfaced with RFID interrogator 300 via a cable, such as a coaxial cable. The further from RFID interrogator 300 an antenna 214 in placed the longer a length of cable is required. Unfortunately, the longer the length of cable the greater the magnitude of loss the cable introduces. The inclusion of a feedback path, such as feedback path 316, can still work to counteract the effects of any such loss.

Figure 4:
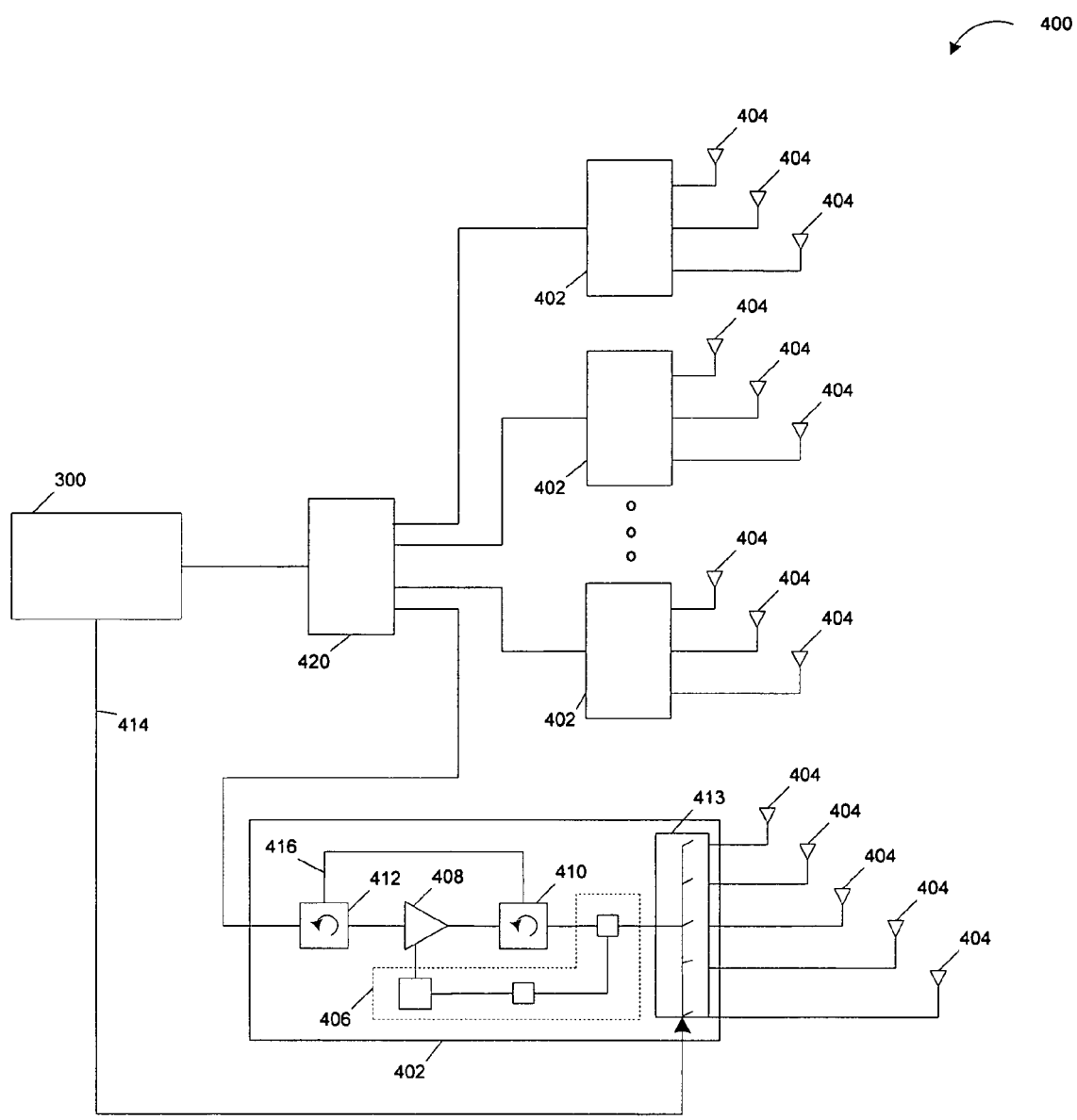
FIG. 4 is a diagram illustrating an example RFID system that comprises multiple amplifier switch blocks in accordance with one embodiment of the invention.

If the plurality of antennas 214 interfaced with RFID interrogator 300 increases beyond a certain point, however, then the ability to compensate for losses introduced by any switching modules placed in the transmit path can become more complicated. One way to overcome this complication, is to use multiple amplifier switching blocks 204 to interface the plurality of antennas with RFID interrogator 300. For example, FIG. 4 illustrates an RFID system 400 that comprises a plurality of amplifier switching blocks 402 in accordance with one embodiment of the systems and methods described herein. As can be seen, system 400 includes an RFID interrogator 300 interfaced with a plurality of antennas 404 via a plurality of amplifier switch blocks 402. In other words, the plurality of antennas 404 are divided into smaller groups with each smaller group being interfaced with their own associated amplifier switching block 402. Each amplifier switching block 402 can comprise a variable gain amplifier 408 as well as energy director 410, return path 416, and energy director 412 configured to direct energy received by an antenna 404 around amplifier 408 and back to RF transceiver 202 within interrogator 300. In addition, each amplifier switching block 402 can comprise a feedback loop 406 configured to sense signal energy at the output of amplifier 408 and feed it back to control the gain of amplifier 408. The output of amplifier 408 can be interfaced with an appropriate antenna 404 via a switching mechanism 418, which can, for example, be controlled by RFID interrogator 300. In addition, a switching mechanism can be placed between interrogator 300 and a plurality of amplified switching blocks 402 to control which amplifier switch block receives the transmit signal generated by RFID interrogator 300. In fact, in certain embodiments each antenna 404 interfaced with a particular amplifier switching block 402 receives a transmit signal generated by the associated amplifier 408. In other words, in certain embodiments, switching mechanisms 418 can be excluded.

In embodiments that use a great deal of antennas, the ability to cascade amplifier switching blocks 402 can be important as it can reduce the number of RFID interrogators 300 required. Since RFID interrogators 300 are often the most costly component of an RFID system, the ability to reduce the number of RFID interrogators 300 required can, therefore, save substantial costs. In addition, the ability to boost the signal strength of signals being transmitted by each amplifier switching block 402 can help increase range and maintain performance, while at the same time ensuring that maximum transmit power levels are not exceeded.

Figure 5:
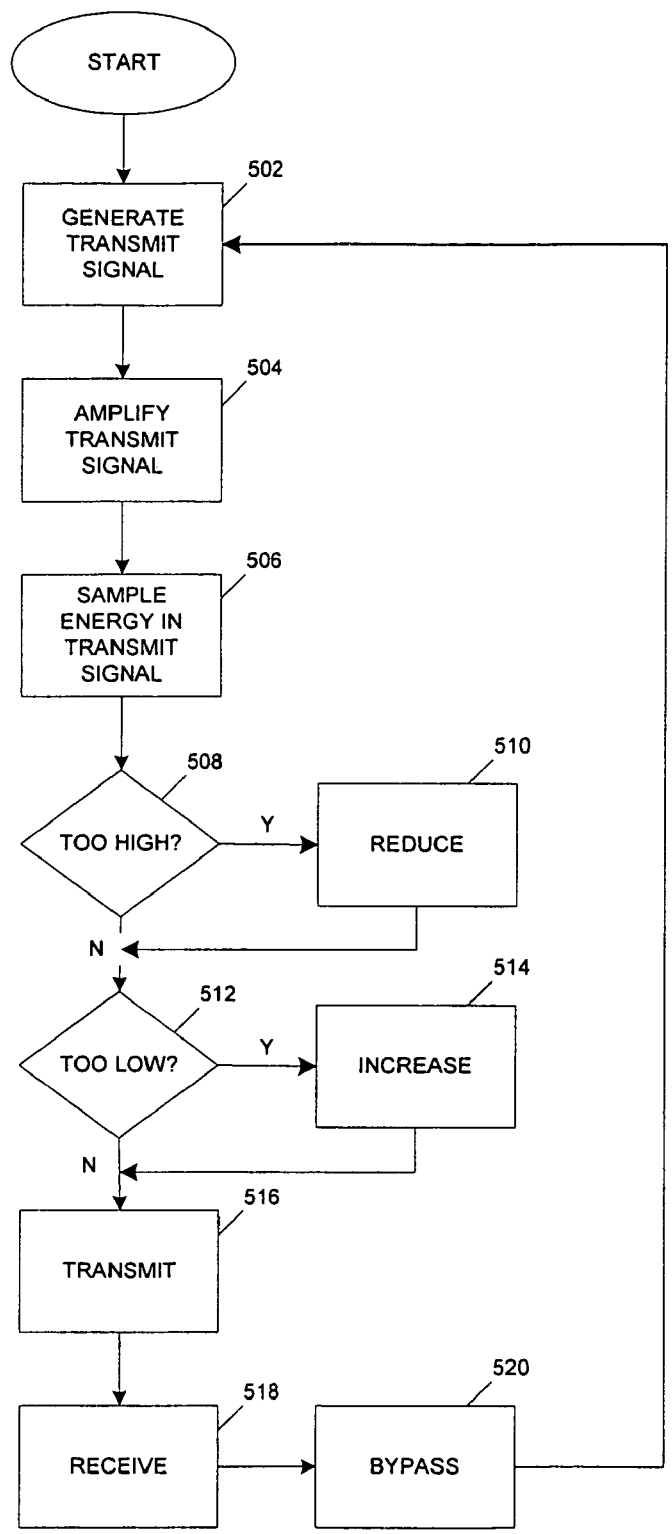
FIG. 5 is flow chart illustrating an example method for communicating with an RFID tag using the system of FIG. 2.

FIG. 5 is a flow chart of a method for sending receiving RFID signals in accordance with one embodiment with the systems and methods described herein. Thus, in step 502 an RFID transmit signal can be generated. For example, RFID transmit signal 206 can be generated by RF transceiver 202. Then, in step 504 the transmit signal can be amplified, e.g., by an amplifier 208. The amplified transmit signal can then be transmitted (step 516), e.g., via an antenna 214; however, in certain embodiments, the energy of the transmit signal can be sampled in step 506. If the transmit energy is too high, as determined in step 508, then it can be reduced in step 510. On the other hand, if the transmit energy is determined to be too low, in step 512, then the transmit power can be increased in step 514. In on embodiment, for example, a bypass path 316 can be included and can be configured to sample some of the energy in the transmit signal and to generate a control voltage that can be used to control the gain of the variable gain amplifier, such as amplifier 208.

In step 516, the amplified signal can be transmitted, e.g., via an amplifier 214, in order to communicate with, or acquire information from, a RFID tag 220. In step 518, a reflected signal can be received from a RFID tag 220. The reflected signal can then be directed around the amplifier used to amplify the transmit signal in step 504.

While certain embodiments of the inventions have been described above, it will be understood that the embodiments described are by way of example only. Accordingly, the inventions should not be limited based on the described embodiments. For example, while embodiments involving a forklift were described above, it should be clear that the systems and methods described herein apply equally to embodiments for tracking a wide range of vehicles and items. Thus, the scope of the inventions described herein should only be limited in light of the claims that follow when taken in conjunction with the above description and accompanying drawings.

What is claimed is:

1. An RFID interrogator, comprising:
an antenna configured to transmit and receive RF signals;
an RF transceiver configured to receive backscatter modulated RF signals, and generate transmit RF signals;
an amplifier coupled with the antenna the antenna and the RF transceiver configured to amplify the transmit RF signals;
a first energy director coupled between the RF transceiver and the amplifier, the first energy director configured to receive the RF transmit signal and direct thorn to the amplifier and to receive backscatter modulated RF signals and direct them to RF transceiver; and
a second energy director coupled between the amplifier and the antenna, the second energy director configured to receive the amplified transmit signals from to amplifier and send the amplified transmit signals to the antenna, and to receive a backscatter modulated RF signal from the antenna and direct the receive backscatter modulated RF signal to the first energy director bypassing the amplifier.

2. The RFID interrogator of claim 1, wherein the antenna transmits signals to, and receives signals from, an RFID tag.

3. The RFID interrogator of claim 1, wherein the directors are circulators.

4. The RFID interrogator of claim 1, wherein the directors are directional couplers.

5. The RFID interrogator of claim 1, wherein the amplifier is a variable gain amplifier (VGA).

6. The RFID interrogator of claim 1, further comprising a feedback loop coupled with the output of the amplifier, the feedback loop configured to sense the output energy from the amplifier and control the amplifier gain in response to the sensed output energy.

7. The RFID interrogator of claim 6, wherein the feedback loop maintains the transmit signal energy at or below a certain level.

8. The RFID interrogator of claim 6, wherein the feedback loop maintains the transmit signal energy at or above a certain level.

9. The RFID interrogator of claim 6, wherein the feedback loop includes an energy coupler, a rectifier, and a power leveling network.

10. The RFID interrogator of claim 1, further comprising a decoder coupled with the RF transceiver, and, wherein the RF transceiver is configured to send the received RF backscatter modulated signals to the decoder.

11. The RFID interrogator of claim 1, further comprising a switch and a plurality of antennas, and wherein the energy director is coupled with the switch, the switch configured to direct the transmit signal to one of the plurality of antennas.

12. The RFID interrogator of claim 11, further comprising a plurality of switches and wherein the energy director is coupled with the plurality of switches, each of the plurality of switches configured to direct the transmit signal to one or more of the plurality of antennas.

13. The RFID interrogator of claim 1, wherein the transmit signal is transmitted to a RFID tag.

14. The RFID scanner of claim 1, wherein the received signal contains data from the RFID tag.

* * * * *

UNITED STATES PATENT AND TRADEMARK OFFICE
CERTIFICATE OF CORRECTION

| | | |
|---|---|---|
| PATENT NO. | : 7,054,595 B2 | Page 1 of 1 |
| APPLICATION NO. | : 10/658633 | |
| DATED | : May 30, 2006 | |
| INVENTOR(S) | : Bann | |

It is certified that error appears in the above-identified patent and that said Letters Patent is hereby corrected as shown below:

Column 6, Line 35, delete the word "thorn" and insert in lieu thereof the word -- them --
Column 6, Line 37, insert the word -- the -- inbetween the words "to" and "RF"
Column 6, Line 40, delete the second instance of the word "to" and insert in lieu thereof the word -- the --

Signed and Sealed this

Nineteenth Day of September, 2006

JON W. DUDAS
*Director of the United States Patent and Trademark Office*